United States Patent [19]
Brienza et al.

[11] 3,824,492
[45] July 16, 1974

[54] SOLID STATE SINGLE FREQUENCY LASER

[75] Inventors: Michael J. Brienza, Manchester; Arnold R. Clobes, Vernon, both of Conn.

[73] Assignee: United Aircraft Corporation, East Hartford, Conn.

[22] Filed: June 22, 1972

[21] Appl. No.: 265,363

[52] U.S. Cl. .............................. 331/94.5, 350/151
[51] Int. Cl. ........................... H01s 3/06, H01s 3/08
[58] Field of Search .................... 331/94.5; 350/151

[56] References Cited
UNITED STATES PATENTS
3,480,877    11/1969    Dillon, Jr. et al. ............... 331/94.5

OTHER PUBLICATIONS
Penney, Jr., et al., Applied Physics Letters, Vol. 9, No. 7, 1 Oct. 66, pp. 257–258, QC 1 A745.
Mikalaine et al., IEEE J. Quantum Electronics, Vol. QE–5, Dec. 1969, pp. 617–618, QC 447 I2.

Primary Examiner—John K. Corbin
Assistant Examiner—R. J. Webster
Attorney, Agent, or Firm—Anthony J. Criso

[57] ABSTRACT

Single frequency, stable laser systems in which a ring resonator having a Brewster ended, solid state rod containing the gain medium are discussed. The lasers which are pumped optically can be operated either continuous wave or pulsed and the phenomenon of spatial hole burning is eliminated by providing a differential loss mechanism in the resonator to avoid the presence of standing waves. The differential loss is disclosed in various specific inventive embodiments wherein the optical rotation and Faraday rotation of a linearly polarized wave of laser energy either cancel or reinforce one another thereby causing the ring resonator to oscillate in only a single preselected direction.

9 Claims, 3 Drawing Figures

SOLID STATE SINGLE FREQUENCY LASER

BACKGROUND OF THE INVENTION

1. Field of Invention

This invention relates to lasers and more particularly to solid state lasers which provide a single frequency output.

2. Description of the Prior Art

There is a present need for for a simple, single frequency solid state laser. Many existing laser systems are multimode during operation and therefore unsuited for applications such as wide band optical communications because the various frequencies in the laser output interfere with the information bearing modulation that is put on the carrier frequency.

In a solid state, laser medium such as neodymium - yttrium aluminum garnet (Nd-YAG) or yttrium aluminate ($YAlO_3$) multifrequency laser action is due to a phenomenon commonly referred to as spatial hole burning. More specifically, with the existence of a standing wave pattern in either a linear or ring resonator in which the active species of the gain medium is immobile or fixed in a solid host material, the electric field of the laser energy results in a maximum of residual inverted population in the energy states at the nodes of the electric field standing wave pattern and a minimum of population occurs at the antinodes. The node regions favor the existence of a second laser mode in the resonator with a standing wave pattern and the rational is repeated thereby resulting in a laser with a plurality of standing waves in the resonator and a multimode output.

Various techniques exist for eliminating spatial hole burning. One such technique relies on movement of the gain medium relative to the standing waves in the resonant optical cavity so that the maxima of the standing waves pass through the regions of high gain at some uniform velocity thereby guaranteeing a more uniform output from the laser system. While the system is conceptually simple, it is impractical because of the difficulty involved in moving either the gain medium itself or the optical components which form the resonant cavity.

Another way to eliminate the standing waves is to propagate only circularly polarized waves through the gain medium. If the laser beam propagated through the gain medium in the forward and reverse direction is left and right circularly polarized respectively with suitable phase relative to one another, two nonintersecting traveling waves can be maintained. Therefore, the various longitudinal modes of the laser beams do not interact and the homogeneously broadened gain medium oscillates producing a coherent output at a single frequency. Implementation of this concept requires the insertion of two quarter wave elements and two polarizing elements into the laser cavity. An inherent limitation on the use of this concept is the requirement that the gain medium be optically isotropic. As a practical matter the means for optically pumping the gain medium invariably induces a birefringence in an otherwise suitable gain medium causing the left and right circularly polarized beams to become somewhat elliptically polarized. The elliptical beams then interact and set up a standing wave pattern.

Another system for avoiding the spatial hole burning phenomenon involves the use of two electro-optic modulators in the resonant optical cavity. The modulators are located on either side of the active gain medium. Modulation of the optic elements in accordance with a suitable schedule causes the standing waves to move with respect to the gain medium in a reciprocating manner at the frequency of modulation although the overall optical length of the cavity remains unchanged. As long as the modulation frequency is greater than the relaxation rate, the spatial hole burning effect is eliminated. Relaxation rate or repumping time is considered to be the time it take the gain medium to resume its condition of inverted energy level population after some perturbation has occurred to alter the energy level populations.

All the techniques described above are applicable to either linear or ring resonators. Still another system which provides the same effect involves the use of passive element outside of the optical cavity. A fully reflecting mirror suitably located with respect to a ring cavity, for example, can redirect the laser energy that leaves the cavity through a partially reflecting surface back into the ring. When the redirected beam is fed into the cavity in the direction which matches the preferred direction of oscillation, the feedback energy reinforces the principal beam thereby draining gain from the homogeneously broad medium and eliminating oscillation in the undesired direction. The system is technically undesirable in many lasers because the fully reflecting mirror requires critical positioning with respect to the resonant cavity; in the Nd-YAG laser in particular, the concept is unworkable.

Another system known in the art involves an optical isolator in a ring resonator; the isolator which includes a forty-five degree Faraday rotator can be used in a ring configuration only as has been described in the open literature by Statz et al. The optical isolator consists of a Faraday rotator capable of rotating circularly polarized beams through forty-five degrees and sandwiched between two linear polarizers with their principal axes aligned forty-five degrees with respect to one another. A wave traveling in an arbitrarily designated forward direction is linearly polarized in passing through one polarizer, is rotated by the Faraday material and passes unaffected through the other polarizer since its direction of polarization is matched to the principal axis of the waveplate. Alternatively, a wave traveling in the reverse direction experiences a forty-degree rotation in the opposite direction due to the Faraday element. Therefore, the reverse direction beam is completely blocked by the second polarizer due to the ninety-degree mismatch between the principal axis of the polarizer and the polarization of the beam. The Statz device requires an element which rotates the beam traveling in the preferred direction by forty-five degrees as is shown in U.S. Pat. No. 3,584,312, in order to perpetuate the beam in the desired direction. Since this system does not utilize the gain medium to discriminate between the clockwise and counterclockwise rotating beams, the gain medium does not have to be optically isotropic. The principal disadvantages of the system are the relatively large losses which are incurred by introducing the isolator into the resonant cavity and the relatively large magnetic field required to produce the required rotation.

A similar method for eliminating spatial hole burning which requires a lesser amount of rotation of the wave traveling in the undesired direction than the Statz technique is known. The method requires that a smaller angular rotation be provided in the optical cavity and oscillation in the preferred direction is achieved by locking onto the preferred mode in a homogeneously broadened gain medium. The system is readily usable if one is willing to accept the manufacturing requirements and the optical losses inherent in the components which must be inserted into the resonant cavity to provide the differential loss.

Laser energy at a single frequency is possible with the use of an etalon in the resonator. In such a system, no attempt is made to suppress any of the various modes at which the resonator can oscillate, rather an etalon is inserted into the optical cavity to reject all frequencies but the desired one which is allowed to pass. The etalon approach to a single frequency laser is very sensitive to motion of the resonator mirrors and its utilizes the gain medium inefficiently.

SUMMARY OF THE INVENTION

An object of the present invention is to provide a compact, single frequency output, stable laser which is characteristically simple and lightweight.

Another object is to produce a single frequency laser output from a solid state, homogeneously broadened, gain medium with a traveling wave which eliminates spatial hole burning in the medium.

According to the present invention, a single frequency beam of laser energy is produced with a ring laser which provides optical rotation of the polarized laser beam and includes a Brewster-ended laser rod of homogeneously broadened gain medium; the rod which exhibits Verdet activity and gain properties, function simultaneously as both a laser gain medium and a Faraday element. By suppressing, for example, the clockwise wave in the ring resonator, the counterclockwise wave becomes a traveling wave that avoids spatial hole burning, and the homogeneously broadened gain medium produces an output of laser energy at a single frequency. In one embodiment the laser rod is birefringent and provides optical rotation of the polarized beam passing therethrough. In another embodiment, a half waveplate is optically integrated into the inner portion of an isotropic or single reflecting rod to produce optical rotation. In still another embodiment, a laser rod is used in combination with a separate half waveplate that is placed in the optical path of the resonator. The present invention can be operated either as a continuous wave or pulsed laser.

One feature of this invention is that relatively few components are required for a fully operable laser system. Also the laser requires a lesser number of components which are optically degradable during normal operation. Further, the concept has good performance characteristics over a sustained period of time. Other features are the simple, lightweight and compact configurations which are readily available. This invention is less susceptible to variation in mirror spacing than any standing wave laser.

A primary advantage of the present invention is the full utilization of the active gain medium by the traveling wave which occurs in the resonator thereby avoiding a positional dependent variation in the population inversion in the gain medium. Other advantages are reduced optical losses and higher energy output of this invention with respect to competing single frequency solid state lasers. The system is relatively inexpensive to construct due in part to the lesser number of optical surfaces which require special optical finishing. A packaged system is relatively lightweight and the optical alignment requirements are typically less stringent than alternate types of single frequency lasers.

The foregoing and other features and advantages of the present invention will become more apparent in the light of the following detailed description of preferred embodiments thereof as illustrated in the accompanying drawing.

DESCRIPTION OF PREFERRED EMBODIMENTS

Figure 1:
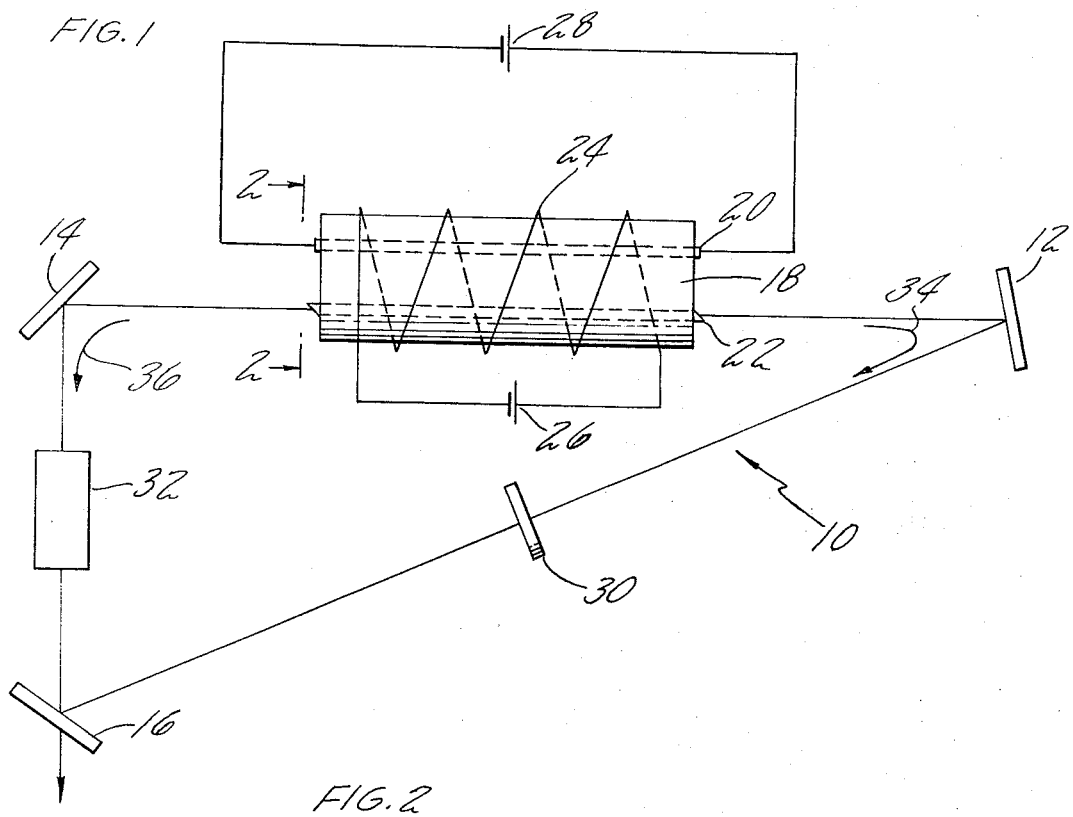
FIG. 1 is a simplified schematic diagram of a ring resonator having a half waveplate and a Brewster-ended optically pumped laser rod in accordance with the present invention.

Referring to FIG. 1, a ring resonator 10 is formed with fully reflecting mirrors 12, 14 and a partially transmitting mirror 16. Inserted in the resonator is an optical pumping cavity 18 containing a pump lamp 20 and laser rod 22; the rod exhibits Verdet activity and the ends of the rod are ground at the Brewster angle. A solenoid 24 which is connected to a solenoid power source 26 envelopes the pumping cavity and a lamp power source 28 is connected by suitable means to the pumping lamp. A half waveplate 30 and a Q-switching element 32 are positioned in the optical path of the resonator as shown. In the front elevation view shown in FIG. 2, the optical cavity 18 is elliptical in cross section with the pumping lamp and the laser rod respectively located at the foci of the ellipse.

The apparatus described above is operated to produce a directionally dependent differential loss with the lamp power supply providing a starting pulse and sustaining current to the pumping lamp that is typically a tungsten filament or krypton arc lamp. The lamp provides suitable optical radiation for pumping the laser rod and light from the pumping lamp is reflected off the inner surface of the pumping cavity 18 and is focused on the laser rod. The rod is a gain medium such as Nd-YAG which absorbes the energy and provides optical gain. Laser oscillations can occur in both a clockwise 34 and a counterclockwise 36 direction in the resonator due to the gain available in the resonator. Since the rod is Brewster ended, the laser energy in the resonator is linearly polarized regardless of the direction of propagation through the ring. When electric current is supplied to the solenoid, a magnetic field is established in the laser rod and the linearly polarized laser energy passing through the rod is rotated through a small angle, theta, by Faraday action. The waveplate 30 is selected to produce an angular rotation of linearly polarized beam which is quantitatively identical to the Faraday rotation. Thus, with suitable alignment of the waveplate, the Faraday rotation of a wave traveling in the direction 36, for example, is canceled by the roation introduced by the waveplate. Further, the wave experiencing this double rotation has a final direction of linear polarization which is aligned in the allowed transmitting direction of the Brewster-ended rod. Both ends of the rod are ground approximately parallel as will be discussed hereinafter in greater detail. Alternatively, a wave traveling through the resonator 10 in the direction 34 is rotated through an angle theta in each of the elements rod 22 and waveplate 30 with the directions of rotation being cumulative. Therefore, the wave arrives back at the rod with a polarization direction which is misaligned with the allowed transmission direction of the Brewster end by an angle of two theta. Under these conditions, the wave is partially reflected out of the resonator and experiences loss. Further passes around the resonator increase the rotation of the wave with respect to the Brewster preferred transmitting orientation thereby further increasing the loss experienced by this wave.

complete attenuation of the clockwise wave is not required to produce a single frequency output from the system. With a single pass differentail loss of approximately one hundredth of one percent, the lower loss counterclockwise wave increases in amplitude at the expense of the higher loss reverse wave with a residual power output in the reverse wave about thirty decibels below the output for the counterclockwise wave.

Since the laser rod acts as a Faraday rotator as well as a gain medium, the Brewster ends of the rod would be expected to be ground at angles which are different from one another by the amount of rotation imparted to the laser wave by the Faraday effect of the rod. However, the amount of rotation involved is typically a degree or less but rarely more than three degrees and over the range of this angle, the difference in reflectivity for the corresponding change in Brewster angle is small. As a practical matter, it is easier to grind a laser rod with parallel Brewster end surfaces rather than to attempt to provide for the finite but very small theoretical difference in orientation angle of the faces of the rod as is dictated by the amount of Faraday rotation.

A further explanation of the differential loss effect on the waves circulating in the clockwise 34 and counterclockwise 36 directions of the resonator shown in FIG. 1 is as follows. The counterclockwise wave can be assumed to originate as a linearly polarized wave in the laser rod and adjacent to one end thereof. As this wave travels through the rod it is amplified and rotated across an angle in the amount theta. Theoretically, the end of the rod is ground so that the wave passes through unimpeded. As a practical matter, there is a small mismatch between direction of polarization in the wave and the allowed axis for transmission through the Brewster end, and a small amount of energy, arbitrarily considered one unit, is reflected from the resonator; as was discussed previously, the mismatch is typically less than one degree and the concomitant amount of reflected energy is less than one percent. After exiting the rod the linearly polarized wave interacts with the half waveplate which rotates the wave, again through an angle theta in amount but in a direction opposite to the sence of rotation caused by the rod. Thus, when the counterclockwise wave arrives back at the laser rod for further amplification, the direction of polarization is aligned with the allowed direction for transmission in the Brewster-ended rod and the wave enters the rod having made a round trip through the resonator with one unit of energy loss due to polarization alignment. Similarly, if the clockwise wave is considered to originate as a linearly polarized wave which is rotated through an angle theta in passing through the laser rod, one unit of energy is lost as this wave leaves the rod. When the clockwise wave encounters the waveplate a rotation in the amount theta and in the same direction as that caused by the rod occurs so that the clockwise wave arrives back at the rod with its direction of polarization misaligned with the allowed axis by an amount two theta. Presuming for small angles that the reflectivity of a Brewster window is proportional to the angular difference between the allowed axis and the incoming beam, the clockwise wave experiences a further reduction in energy of two units for at total round trip polarization loss of three units. The actual reflectivity of a Brewster window is not a linear function of the angle involved and the differential loss effect just described is usually greater than three to one.

The amount of rotation required to provide the differential loss essential to the directional discrimination is dependent upon the gain of the laser rod. It should be apparent that for a high gain system the required rotation is greater than that required in a low gain system. Actually, the rotation necessary is dependent upon the gain-loss relationship. If the laser gain is significantly in excess of the the losses introduced by the mismatched polarization, the amount of rotation necessary is less than if the laser gain is just barely greater than the resonator losses.

Figure 2:
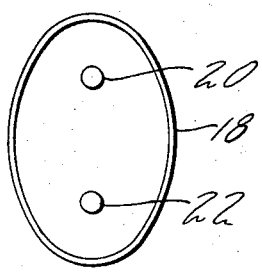
FIG. 2 is a view of the optical cavity taken on the line 2—2 of FIG. 1.

The optical cavity which is required to pump the gain medium is shown in FIG. 2 to be elliptical in cross section with the pumping means and the active gain medium at the foci of the ellipse. While this is a preferred embodiment, alternate embodiments include variously shaped optical cavities such as spheres or close coupled schemes, the only requirement being that energy at a suitable wavelength be provided to the gain medium by an arc lamp or other readily substitutable energy source. Also, the preferred embodiment is shown with the magnetic field being provided with a solenoid coil but it should be apparent that various alternate means for providing a magnetic field can be used.

The present invention is capable of being operated as either a continuous wave or as a pulsed output system. The characteristic times required for multiple optical transits through the resonator are small relative to the duration of pulses of interest so that the requirement of several transits to discriminate between the waves progressing in the forward and reverse directions through the resonator imposes no limitation on the use of the system as a pulsed laser if in fact several transits are required to yield the desired discrimination.

Figure 3:
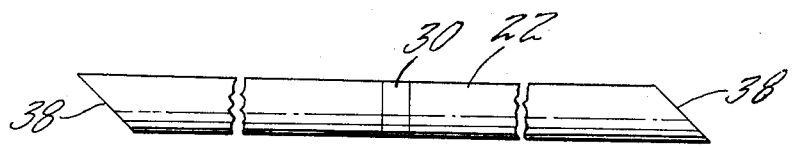
FIG. 3 is a simplified schematic diagram of a laser rod in which a half wave plate is optically integrated into the rod.

In FIG. 3, the laser rod 22 is shown with the half waveplate 30 optically integrated into the rod. The rod has its end surfaces 38 ground at the appropriate Brewster angle. While a rod which is Brewster ended to the theoretically precise angle provides the best performance with respect to the rejection of a misaligned polarized beam passing therethrough, the ends of the rod need not necessarily be ground with theoretical precision. As long as the angle of the rod end faces is within about a few degrees of the precise Brewster angle, a different loss can be produced in the resonator. Of course the greater the deviation of the angle the poorer the performance is. The operation of this invention with the half waveplate and the gain medium integrated into a single component is conceptually the same as a system having the gain medium and the waveplate physically separated as is shown in FIG. 1. The integrated waveplate embodiment obviously results in a further reduction in the number of optical surfaces in the resonator.

Another embodiment of the present invention involves incorporating the characteristic of birefringence into the laser rod thereby allowing the elimination of the half wave-plate. A laser rod of a material such as $YAlO_3$ which is inherently birefringent is a natural candidate for this embodiment. An isotropic material such as Nd-YAG may also be used without a waveplate in which case the required birefringence may be induced in the rod by various means such as mechanical or thermal stressing. With a suitable birefringence in the laser rod, the directionally dependent differential loss mechanism which is essential to successful operation is provided. Although we have no theoretical rationale to support this point, operation of a birefringent rod without a waveplate requires that the magnetic field be of nonuniform magnitude throughout the rod. The magnetic field must be either a variable intensity along the entire length of the rod or a constant intensity along only some portion of the rod. Under the conditions just described, the laser rod acts as a polarizer due to the ends which are ground at the Brewster angle; the rod acts as a Faraday rotator due to the Verdet activity induced by the axial magnetic field; the rod acts as an optical rotator due to the anisotropic characteristic; and the rod acts as a gain medium due to the active laser material incorporated therein.

While various embodiements of the present invention have been described operationally in terms of a continuous wave output laser, the insertion of a conventional Q-switching element such as a Kerr Cell into the optical path of the resonator causes the apparatus to provide pulses of output laser energy.

Those familiar with the construction of electro-optic devices will appreciate the desirability of reducing the number of components in any such system to an absolute minimum. In the present invention, a minimum number of coacting elements is combined to produce a stable single frequency beam of laser energy. In some embodiments the functions of rotation, amplifications and differential loss are provided by the interactions of the laser rod in a magnetic field and a half waveplate. With these cooperating elements, the performance degradation of the overall system which occurs with sustained operation is reduced because the number of optically degradable surfaces is reduced. Further, the lesser number of cooperating elements results in a compact, rugged resonator assembly which is readily compatible with more application environments than alternate single frequency laser systems currently available. A most immediate application for the present invention is as a high rate data optical communication system in space where lightweight and compactness are a premium.

Although this invention has been shown and described with respect to preferred embodiments thereof, it should be understood by those skilled in the art that various changes and omissions in the form and detail thereof may be made therein without departing from the spirit and scope of the invention.

Having thus described typical embodiments of our invention, that which we claim as new and desire to secure by Letters Patent of the United states is:

1. A stable laser system capable of providing an output beam of continuous wave single frequency radiation comprising:
 a ring resonator for the production of coherent radiation by the stimulated emission of radiation in a gain medium, the resonator having an optical path therethrough;
 an optical pumping cavity positioned in the path and including:
  a solid laser rod positioned within the pumping cavity, the rod having essentially parallel end faces and a cylindrical axis which is aligned along the optical path, the rod containing the laser gain medium and exhibiting Verdet activity for functioning simultaneously as both a laser gain element and as a Faraday rotator element, and birefringence, the end faces being at substantially the Brewster's angle; and
  a source of optical radiation positioned internal of the pumping cavity to provide a population inversion in the gain medium by producing optical radiation which is concentrated in the gain medium by the pumping cavity; and
 means for providing a magnetic field which is nonuniform in magnitude along the rod.

2. The invention according to claim 1 including Q-switching means which are positioned in the path to control the Q of the cavity by completing, interrupting or changing the optical path through the resonator.

3. The invention according to claim 1 wherein the rod host material is yttrium orthoaluminate.

4. A single frequency laser comprising:
 a ring resonator for the production of coherent radiation by the stimulated emission of radiation in the gain medium, the resonator having an optical path therethrough;
 an optical pumping cavity positioned in the path and including:
  a Neodymium-YAG rod which exhibits verdet activity for functioning simultaneously as both a laser gain element and as a Faraday rotator element, and which is positioned within the pumping cavity, the rod having a cylindrical axis which is aligned along the optical path and essentially parallel end faces that are at substantially the Brewster's angle, with a half wave plate optically integrated into the rod and
  optical pumping means positioned internal of the pumping cavity for producing a population inversion in the gain medium by providing optical radiation which is concentrated in the gain medium by the pumping cavity; and means for providing a magnetic field which is nonuniform in magnitude axially along the gain medium.

5. The invention according to claim 4 including Q-switching means which are positioned in the path.

6. A stable laser for the production of output energy at a single frequency comprising:
 a ring resonator for the production of coherent radiation by the stimulated emission of radiation in the gain medium, the resonator having an optical path therethrough;
 an optical pumping cavity positioned in the path and including:
  a solid laser gain medium which exhibits Verdet activity for functioning simultaneously as both a laser gain element and as a Faraday rotator element, and is in the form of a rod with each of the ends of the rod at substantially the Brewster's angle, the rod having a cylindrical axis which is aligned along the optical path; and optical pumping means positioned internal of the pumping cavity for producing a population inversion in the gain medium by providing optical radiation which is concentrated in the gain medium by the pumping cavity; and means for providing a magnetic field which is nonuniform in magnitude axially along the gain medium; and a half wave plate which is positioned in the path.

7. The invention according to claim 6 wherein the ends of the rod are ground at the Brewster's angle.

8. The invention according to claim 6 including Q-switching means which are positioned in the path to control the Q of the cavity by completing, interrupting or changing the optical path through the resonator.

9. The invention according to claim 6 in which the gain medium is neodymium-yttrium-aluminium-garnet.

* * * * *